(12) United States Patent
Goldschmidt

(10) Patent No.: US 6,772,194 B1
(45) Date of Patent: Aug. 3, 2004

(54) DIRECTORY BAND SHELL EXTENSION

(75) Inventor: Cassio Goldschmidt, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 629 days.

(21) Appl. No.: 09/604,933

(22) Filed: Jun. 27, 2000

(51) Int. Cl.[7] .......................... G06F 13/00; G06F 17/30
(52) U.S. Cl. .................... 709/203; 709/217; 709/219; 707/10
(58) Field of Search ................................ 709/200, 201, 709/203, 217, 218, 219; 707/3, 4, 5, 10

(56) References Cited

U.S. PATENT DOCUMENTS 5,515,488 A * 5/1996 Hoppe et al. ............... 395/140
5,608,899 A * 3/1997 Li et al. ...................... 395/600
5,864,860 A * 1/1999 Holmes ....................... 707/101
5,911,138 A * 6/1999 Li et al. ......................... 707/3

* cited by examiner

Primary Examiner—Moustafa M. Meky (57) ABSTRACT

A method and system thereof for retrieving data, for example from a web site in a computer system network. A user enters a query using a graphical user interface (e.g., a desk band containing an editbox). The query is sent to a server computer system. Instead of displaying a web page for the web site, the database for the web site is accessed directly. Information in response to the query is retrieved from the database and displayed to the user. It is not necessary to generate a web page or launch a web browser, and so information can be more readily and quickly retrieved.

15 Claims, 8 Drawing Sheets

DIRECTORY BAND SHELL EXTENSION

TECHNICAL FIELD

The present invention relates to the field of computer system networks. More specifically, the present invention pertains to a method and system for accessing information from a site on a computer system network.

BACKGROUND ART

A "computer system network" can refer to a network located within a firewall of an organization or corporation (e.g., an "Intranet") as well as to the familiar World Wide Web (WWW) or Internet. In general, computer system networks include numerous server computer systems and client computer systems with attendant equipment such as routers and switches for properly directing traffic (e.g., data, queries, search items, etc.) to their proper destination (e.g., a Web site). With the proliferation of traffic over computer system networks, some popular Web sites need to handle and respond to a high volume of traffic.

Figure 1:
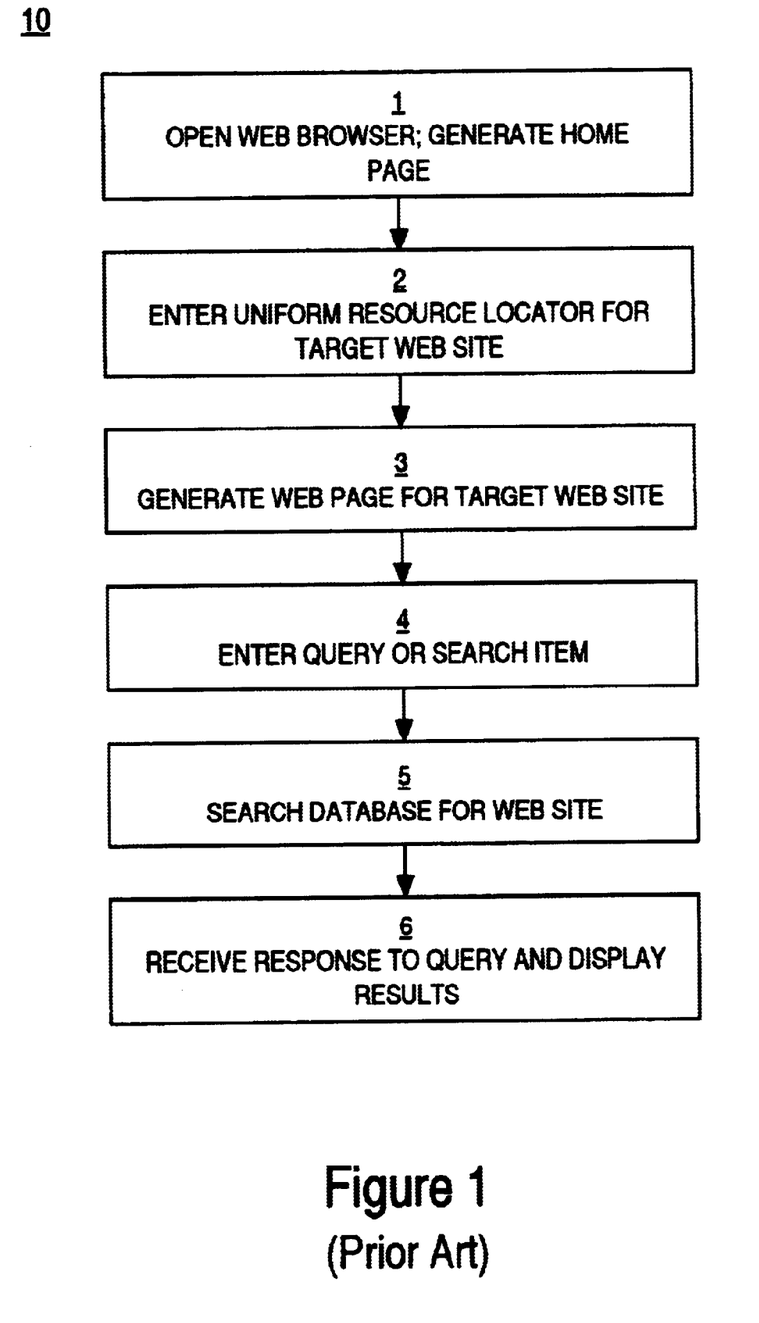
FIG. 1 is a flowchart of the steps in a process for retrieving information from a Web site in accordance with one prior art embodiment.

Prior Art FIG. 1 is a block diagram illustrating a process 10 that typically needs to be performed in order to retrieve information from a target Web site. The target Web site resides on a server computer system communicatively linked to a client computer system by the computer system network.

In step 1, a user opens a Web browser residing on his/her computer system (e.g., a client computer system). This is a familiar routine in which the user typically uses a mouse to select and click on an icon displayed on the computer's monitor, which causes the Web browser to launch. Web browsers are relatively complex software models, and so the process of launching the browser usually can take several seconds to complete.

In step 2, once the Web browser is launched, the user enters the Uniform Resource Locator (URL) address for the target Web site into an editbox. The browser can then establish a communication link between the client computer system and the target Web site over the network.

If the URL address is not known, the user needs to perform a search for the address using a search engine. The search process can generally take a few minutes, depending on how quickly the user can narrow the search criteria until the desired Web site is found.

In step 3, the Web page for the Web site is downloaded and displayed on the monitor of the client computer system. Depending on the complexity of the Web page and the speed of the connection between the client and server computer systems, the Web page can sometimes take many seconds to be downloaded, built and displayed.

In step 4, the user enters a query or search item into an editbox on the Web page. For example, consider a Web site that serves as a company directory. This Web site will provide access to a database listing the names, phone numbers, e-mail addresses, etc., for company employees. In this case, the user enters an employee's name into the editbox to launch a search for the employee's directory information.

In step 5, in response to the query, a search of the database is performed by the server computer system. Once the pertinent information is found, the server computer system sends the information to the client computer system where it can be displayed to the user (step 6).

As shown by the above discussion, there are several sources of delay associated with prior art methods for retrieving information from a Web site. Namely, there can be delays associated with launching the Web browser, searching for the URL address of a desired Web site (if the address is not known), and downloading and displaying the Web page for the site.

These problems are exacerbated when the targeted Web site is a popular site that may be accessed several times a day by each of many users. For example, consider again a Web site that serves as a company's directory. Such a site will likely see a very high volume of traffic, with thousands of employees accessing the site multiple times each day.

In order to access the directory, some users may open and close a Web browser several times a day. To speed up access, some users may open the Web browser and keep it open all day. In either case, the processing and memory resources of the client computer system are consumed by launching and executing the browser, slowing the overall performance of the computer. In addition, the resources of the client computer system are consumed while Web page is downloaded and built. The resources of the server computer system can be similarly affected while responding to the browser and sending information to build the Web page. Furthermore, worker productivity is decreased because of the delays associated with accessing and retrieving information from the Web site.

Accordingly, what is needed is a method and/or system for improving access to Web sites, in particular popular Web sites that see a high volume of traffic. What is also needed is a method and/or system that satisfies the above need and that can reduce the time needed for a user to retrieve information from a Web site. What is also needed is a method and/or system that satisfies the above needs and that can reduce the impact on network resources, primarily with regard to the memories and processors of the client and server computer systems. The present invention provides a novel solution to the above needs.

DISCLOSURE OF THE INVENTION

The present invention provides a method and system for improving access to data, such as data comprising information for a Web site, in particular a popular Web site that sees a high volume of traffic. The present invention also provides a method and system that can reduce the time needed for a user to retrieve such data. In addition, the present invention provides a method and system that can reduce the impact on network resources, primarily with regard to the memories and processors of the client and server computer systems.

In the present embodiment, the present invention is integrated with the operating system of a client computer system. In this embodiment, an extension to the shell of the operating system is executed when the computer system is powered on. The extension causes a graphical user interface (e.g., a desk band containing an editbox) to be displayed in which the user can enter a query. In response to the query, the database is accessed and searched. The database may reside on the client computer system or it may reside on a server computer system communicatively coupled to the client computer system in a computer system network. Information in response to the query is retrieved from the database and displayed to the user in a pop-up menu.

In one embodiment, the database comprises information for a Web site residing on a server computer system communicatively coupled to the client computer system in a computer system network. In this embodiment, in response to a query, the database for the Web site is accessed directly instead of displaying a Web page for the Web site. Thus, in accordance with the present embodiment, it is not necessary to generate a Web page or launch a Web browser, and so information can be readily and quickly retrieved. In addition, the present invention consumes less memory, requires fewer mouse clicks, provides a faster response, and is readily available to a user.

In one embodiment, by selecting one of the entries in the information received from the database, an application can be automatically initiated. For example, if the database pertains to a company directory containing employee information, an employee's e-mail address may be provided in response to a query. By selecting the e-mail address (e.g., clicking on the address with a mouse), an e-mail application for sending a message can be initiated, with the e-mail address already appropriately placed in the message.

These and other objects and advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

PRIOR ART

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "entering," "initiating," "sending," "accessing," "receiving," "providing," "displaying" or the like, refer to actions and processes (e.g., process 500 of FIG. 5) of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

Figure 2:
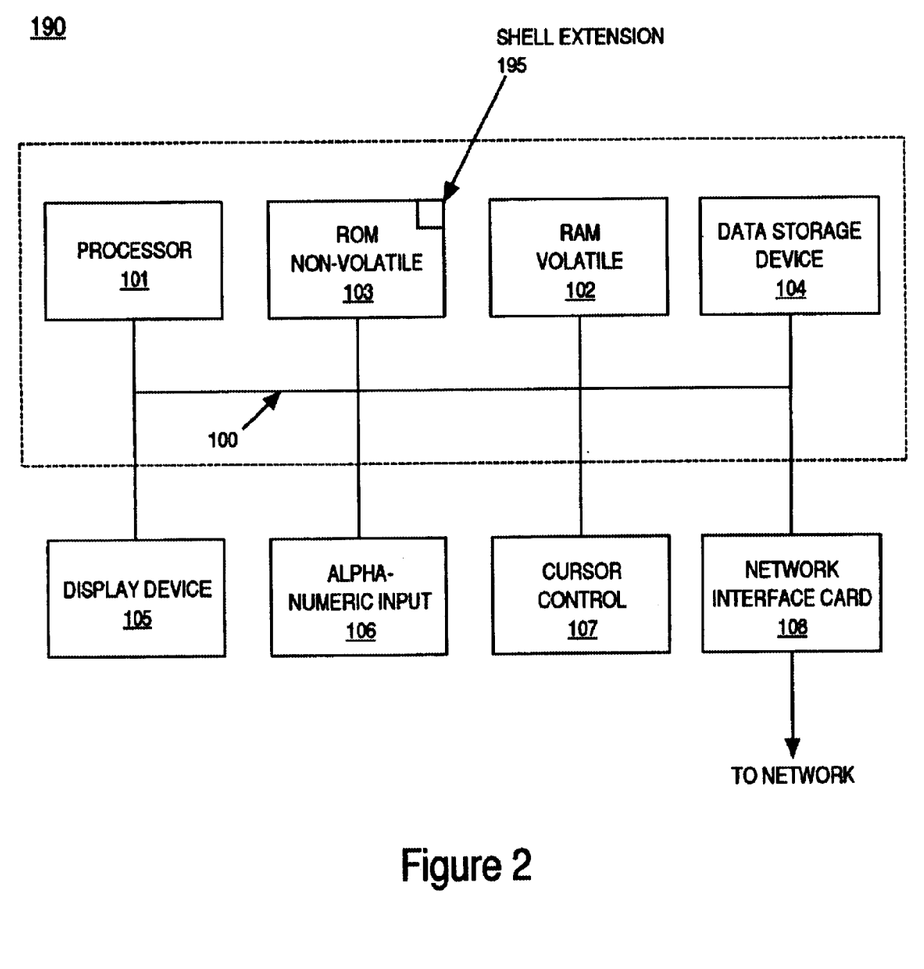
FIG. 2 is a block diagram of an exemplary computer system upon which embodiments of the present invention may be practiced.

Refer now to FIG. 2 which illustrates an exemplary computer system 190 upon which embodiments of the present invention may be practiced. In general, computer system 190 comprises bus 100 for communicating information, processor 101 coupled with bus 100 for processing information and instructions, random access (volatile) memory (RAM) 102 coupled with bus 100 for storing information and instructions for processor 101, read-only (non-volatile) memory (ROM) 103 coupled with bus 100 for storing static information and instructions for processor 101, data storage device 104 such as a magnetic or optical disk and disk drive coupled with bus 100 for storing information and instructions, a user output device such as display device 105 coupled to bus 100 for displaying information to the computer user, a user input device such as alphanumeric input device 106 including alphanumeric and function keys coupled to bus 100 for communicating information and command selections to processor 101, and a user input device such as cursor control device 107 coupled to bus 100 for communicating user input information and command selections to processor 101. Furthermore, a network interface card (NIC) 108 or like device is used to couple computer system 190 onto, for example, a client-server computer system network (e.g., network 170 of FIG. 3 below).

With reference still to FIG. 2, display device 105 utilized with computer system 190 may be a liquid crystal device, cathode ray tube, or other display device suitable for creating graphic images and alphanumeric characters recognizable to the user. Cursor control device 107 allows the computer user to dynamically signal the two-dimensional movement of a visible symbol (pointer) on a display screen of display device 105. Many implementations of the cursor control device are known in the art including a trackball, mouse, joystick or special keys on alphanumeric input device 106 capable of signaling movement of a given direction or manner of displacement. It is to be appreciated that the cursor control 107 also may be directed and/or activated via input from the keyboard using special keys and key sequence commands. Alternatively, the cursor may be directed and/or activated via input from a number of specially adapted cursor directing devices.

In accordance with the present embodiment of the present invention, a shell extension 195 is added to the shell of the operating system of computer system 190. In one embodiment, shell extension 195 is implemented as software instructions stored in memory (e.g., ROM 103) and executed by processor 101. In another embodiment, shell extension 195 is implemented on a magnetic or optical disk (e.g., data storage device 104) that may be read into memory (e.g., RAM 102) and/or executed by processor 101.

As will be seen, shell extension 195 permits fast and direct access to information residing in a database residing on computer system 190, or a database residing on a server computer system. For example, in accordance with one embodiment of the present invention, the database comprises information for a Web site. In this embodiment, the database is accessed without having to launch a Web browser and by bypassing the Web page. Additional information is provided in conjunction with FIGS. 5, 6A and 6B below.

In one embodiment, shell extension 195 is a dynamic link library (DLL) that executes when computer system 190 is powered on; that is, when the operating system 190 "boots up," the shell extension of the present invention also boots up. In one embodiment, the present invention is implemented with a Windows operating system (e.g., Windows 2000); however, it is appreciated that the present invention can be used with other operating systems such as Unix, Linux, and the like.

In the present embodiment of the present invention, shell extension 195 includes a set of encoded program instructions for providing a graphical user interface that allows a user to enter a query, a search item, or the like. In the Windows embodiment, the graphical user interface is a desk band with an editbox placed in the "desktop" window (e.g., the window normally displayed to the user). In one Windows embodiment, the editbox is placed in the taskbar. Additional information is provided in conjunction with FIG. 4 below.

In the present embodiment, shell extension 195 also includes a set of encoded program instructions for implementing a protocol that allows the database to be accessed directly to respond to a query, perform a search, or the like. In one embodiment, the protocol used by shell extension 195 is the Lightweight Directory Access Protocol (LDAP). It is appreciated that other protocols may be used depending on factors such as the type of information stored in the database, the architecture of the database, and the type of search engine being used.

In accordance with the present invention, different search engines can be installed on computer system 190 for accessing, searching and displaying data from different types of databases. For example, one search engine may be used to query employee information in a company directory, and a different search engine could be used to query a database with stock information. A user can switch back and forth between the various search engines installed on computer system 190 by accessing a menu and selecting the search engine suitable to the search to be performed. Thus, in accordance with the present invention, the database does not have to be in a specific format. In addition, the database can reside on computer system 190 or on a server computer system in a computer system network (e.g., network 170 of FIG. 3).

The search engines of the present invention can be used in any application that supports COM (the known Component Object Model). For example, the LDAP search engine can be used with a MS-Word document to fulfill specific fields of the document using macros, or inside a VisualBasic program, or inside a Web browser.

Figure 3:
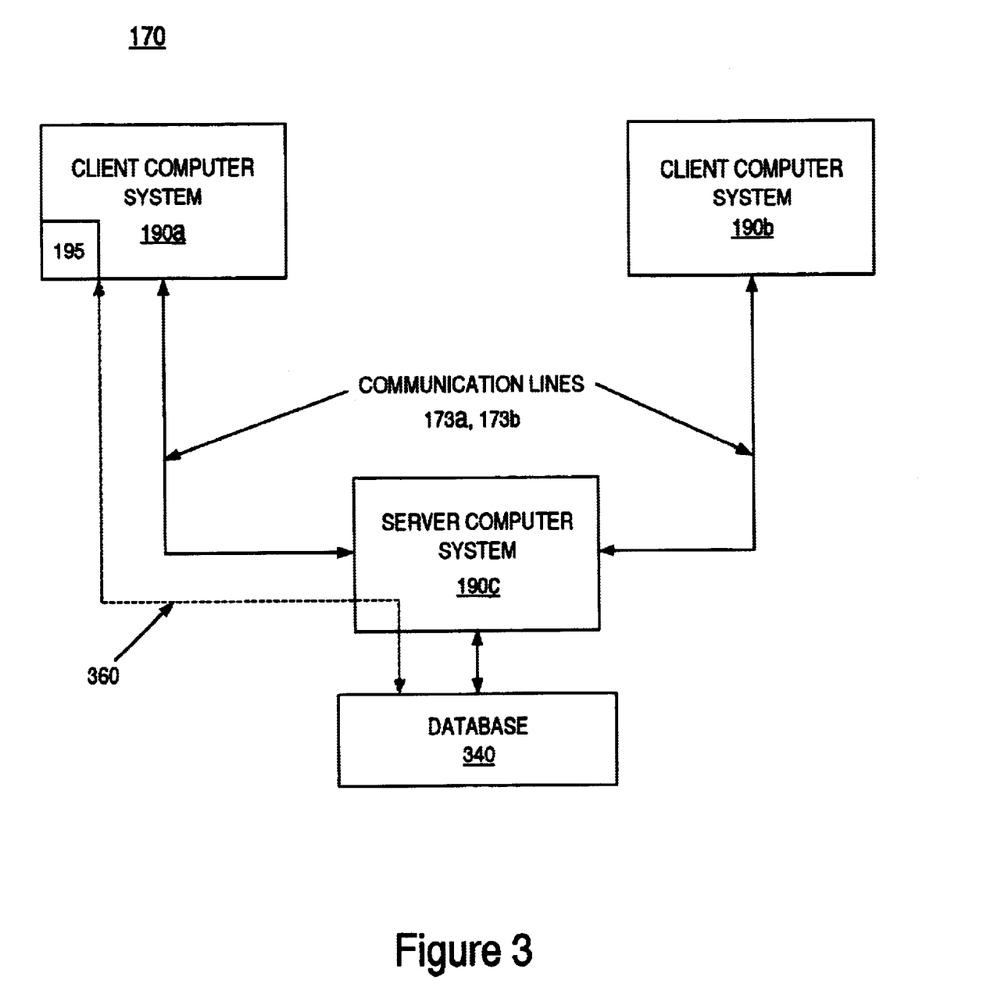
FIG. 3 is a block diagram illustrating an exemplary client-server computer system network upon which embodiments of the present invention may be practiced.

FIG. 3 is a block diagram illustrating an exemplary client-server computer system network 170 ("network 170") upon which embodiments of the present invention may be practiced. Network 170 may be a communication network located within a firewall of an organization or corporation (an "Intranet"), or network 170 may represent a portion of the World Wide Web or Internet.

Client (or user) computer systems 190a and 190b and server computer system 190c are communicatively coupled via communication lines 173a and 173b; the mechanisms for coupling computer systems over the Internet or over Intranets are well-known in the art. This coupling can be accomplished over any network protocol that supports a network connection, such as Internet Protocol, TCP (Transmission Control Protocol), NetBIOS, IPX (Internet Packet Exchange), and LU6.2, and link layers protocols such as Ethernet, token ring, and ATM (Asynchronous Transfer Mode). Alternatively, client computer systems 190a and 190b can be coupled to server computer system 190c via an input/output port (e.g., a serial port) of server computer system 190c; that is, client computer systems 190a and 190b and server computer system 190c may be non-networked devices. It is appreciated that, for simplicity, only two client computer systems and a single server computer system are shown; however, it is understood that network 170 may comprise any number of client computer systems and server computer systems.

In accordance with the present embodiment of the present invention, client computer system 190a implements shell extension 195. In the present embodiment, a database 340 resides on server computer system 190c; however, it is appreciated that in other embodiments the database can reside on client computer system 190a or 190b. Database 340 contains information that typically can be accessed from a Web site using a Web browser. For example, database 340 can contain company directory information such as employee names, phone numbers, pager numbers, e-mail addresses, and the like. However, in accordance with the present invention, database 340 is accessed by computer system 190a without building a Web page. Furthermore, in accordance with the present invention, database 340 is accessed by computer system 190a without launching a Web browser. Instead, database 340 is directly accessed by client computer system 190a as exemplified by the communication path labeled 360.

In one embodiment, database 340 uses the known Lightweight Directory Access Protocol (LDAP). In this embodiment, client computer system 190a also uses LDAP to search and/or query database 340. However, it is appreciated that, in other embodiments, other protocols may be used depending on factors such as the type of information stored in the database, the architecture of the database, and the type of search engine being used.

Figure 4:
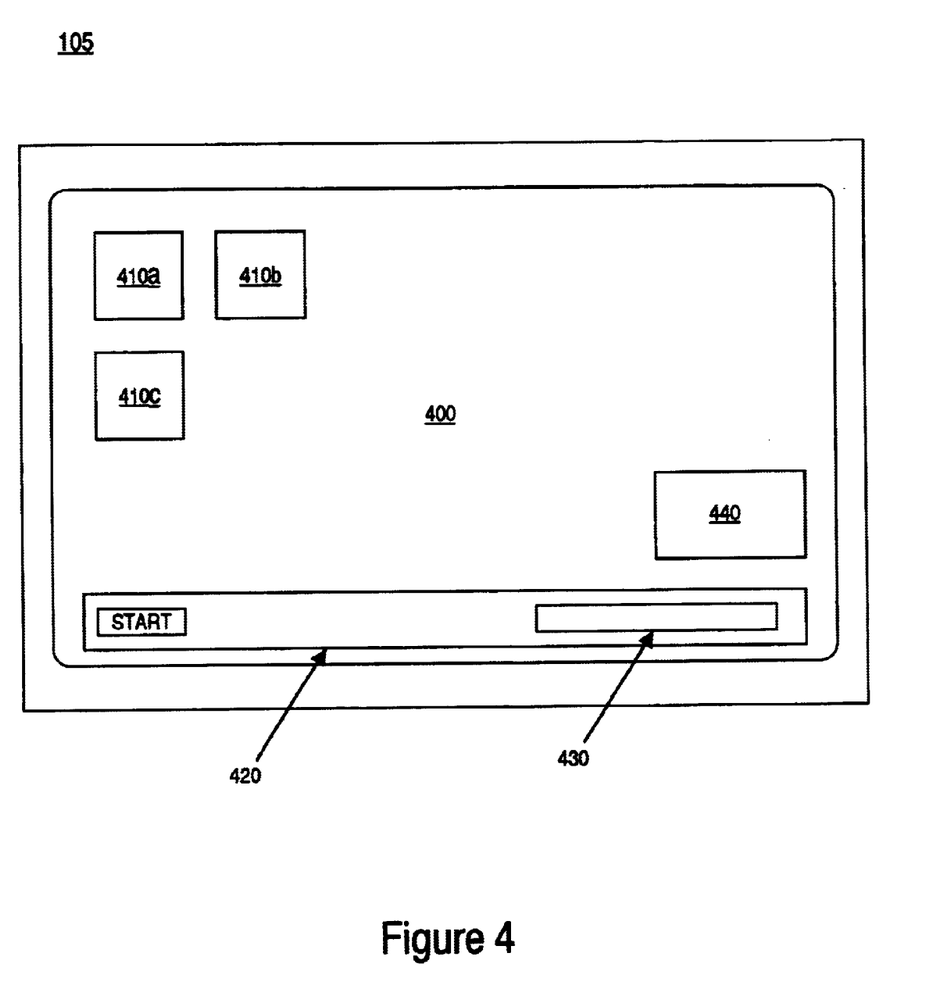
FIG. 4 is an illustration of an exemplary display screen in accordance with one embodiment of the present invention.

FIG. 4 is an illustration of an exemplary display (video) screen 400 displayed on a display device 105 in accordance with one embodiment of the present invention. In this embodiment, display screen 400 is in a Windows format (e.g., Windows 2000), although it is appreciated that other display formats may be used in accordance with the present invention. In the Windows format, display screen 400 typically includes a plurality of icons exemplified by icons 410a, 410b and 410c, and a taskbar 420.

In accordance with the present embodiment of the present invention, a desk band (e.g., a Windows desk band) with a child editbox ("editbox") 430 is generated by shell extension 195 (FIG. 2) and displayed on taskbar 420. However, editbox 430 can be moved to another location on display screen 400 depending on a user's preferences. The editbox allows a user to enter a query, a search item, or the like. In accordance with the present invention, in response to the user input, a Web site database (e.g., database 340 of FIG. 3) is accessed directly, without launching a Web browser.

In response to the query, in the present embodiment, information retrieved from database 340 is displayed in a pop-up menu 440. Menu 440 may be the top menu in a hierarchy of other menus.

Figure 5:
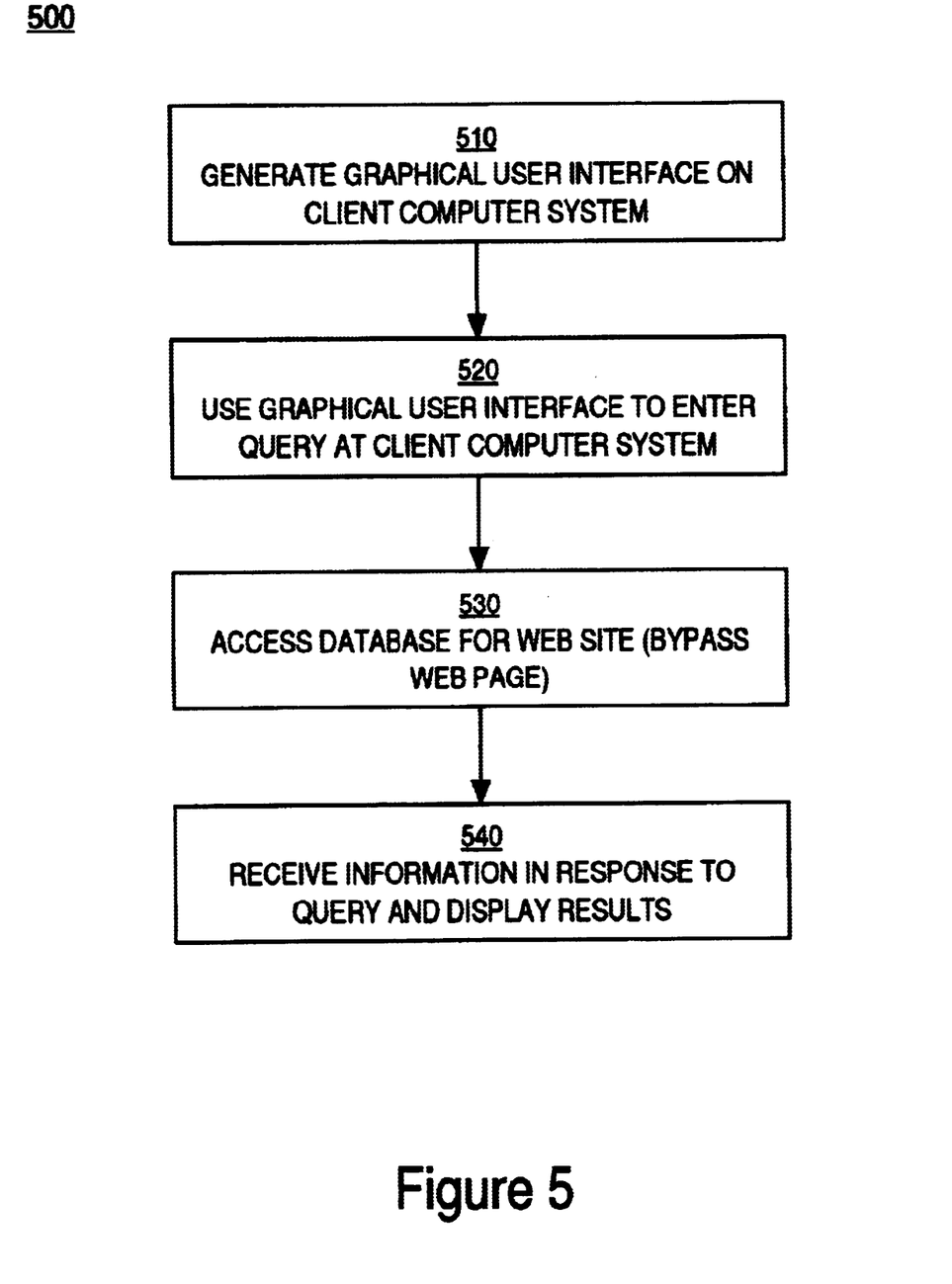
FIG. 5 is a flowchart of the steps in a process for retrieving information from a Web site in accordance with one embodiment of the present invention.

FIG. 5 is a flowchart of the steps in a process 500 for retrieving information from a Web site in accordance with one embodiment of the present invention. In other embodiments, information can be retrieved from a database residing on a server computer system or on a client computer system; refer to FIG. 3. Process 500 can be implemented via computer-readable program instructions stored in a memory unit (e.g., random access memory 102, read-only memory 103, and/or data storage device 104) and executed by processor 101 of computer system 190 (FIG. 2) in a client-server computer system network (e.g., network 170 of FIG. 3).

In step 510 of FIG. 5, in the present embodiment, computer system 190 implements shell extension 195, typically when computer system 190 is powered on (booted up). Accordingly, per the program instructions provided by shell extension 195, a graphical user interface (such as that shown by video screen 400 of FIG. 4) is displayed to a user.

In step 520 of FIG. 5, in the present embodiment, a user enters a query or search item into editbox 430 (FIG. 4) on a client computer system (e.g., client computer system 190a of FIG. 3). For example, in the case in which the query pertains to a company directory, the user enters the name of a person for whom directory information is sought. Alternatively, the user can enter a portion of the name, such as first name or last name only, or simply a sequence of letters appearing in the person's name. A user can also enter into editbox 430 a query or search item pertaining to one of the fields in the company directory; that is, instead of the person's name, the user can enter an organization name, an extension number, an e-mail address or the like. Thus, a search of a database can be performed based on any of the fields in the database.

In step 530 of FIG. 5, in the present embodiment, the query is sent from client computer system 190a to database 340 of server computer system 190c (FIG. 3). As described above, it is appreciated that in other embodiments database 340 may reside on client computer system 190a. In accordance with the present embodiment of the present invention, database 340 is accessed directly, without the use of a Web browser and without downloading and generating a Web page. In addition, the user does not need to enter the Uniform Resource Locator for a Web site associated with database 340. In the present embodiment, client computer system 190a uses LDAP to access and search database 340.

In step 540 of FIG. 5, in the present embodiment, the results of the search are received by client computer system 190a and displayed on video screen 400 in a menu 440 (FIG. 4). In the case in which database 340 is a company directory, for example, menu 440 would be a top-level menu containing an employee's name, phone number, e-mail address, pager number, and the like, or a subset of this information. Additional information can be viewed by opening a second-level menu.

In the case in which the query or search identified more than one entry in database 340 matching the user input, than menu 440 would be a top-level menu showing each of the entries (e.g., a list of employee names matching the user input). Additional information with regard to each of the entries can be viewed by selecting one of the entries, thereby opening a second-level menu containing information corresponding to the selected entry.

Thus, in accordance with the present invention, it is not necessary to download and build a Web page or launch a Web browser, and so information can be readily and quickly retrieved. In addition, the present invention consumes less memory, requires fewer mouse clicks, provides a faster response, and is readily available to a user. Furthermore, a user does not need to know the Uniform Resource Locator for the Web site providing the information.

In one embodiment, by selecting one of the entries in the information received from database 340, an application can be automatically initiated. For example, if the database or Web site pertains to a company directory containing employee information, an employee's e-mail address may be provided in response to a query. By selecting the e-mail address (e.g., clicking on the address with a mouse), an e-mail application for sending a message can be automatically initiated, with the e-mail address already appropriately placed in the message.

In addition, information provided in response to a query can be dragged-and-dropped and/or copied-and-pasted to another location or application. For example, in the case of a company directory in which an employee's e-mail address is provided in response to a query, the e-mail address can be copied and pasted, or dragged and dropped, into an e-mail message.

Furthermore, a user can configure how and what information is to displayed in the pop-up menus. For example, in the case of a database or Web site providing a company directory, an employee's name may be displayed in a "last name, first name" format. In accordance with the present invention, a user can customize the display settings to instead show, for example, "last name, nickname." Similarly, a user can change the order of the information displayed, delete unnecessary information, or add information.

Figure 6A:
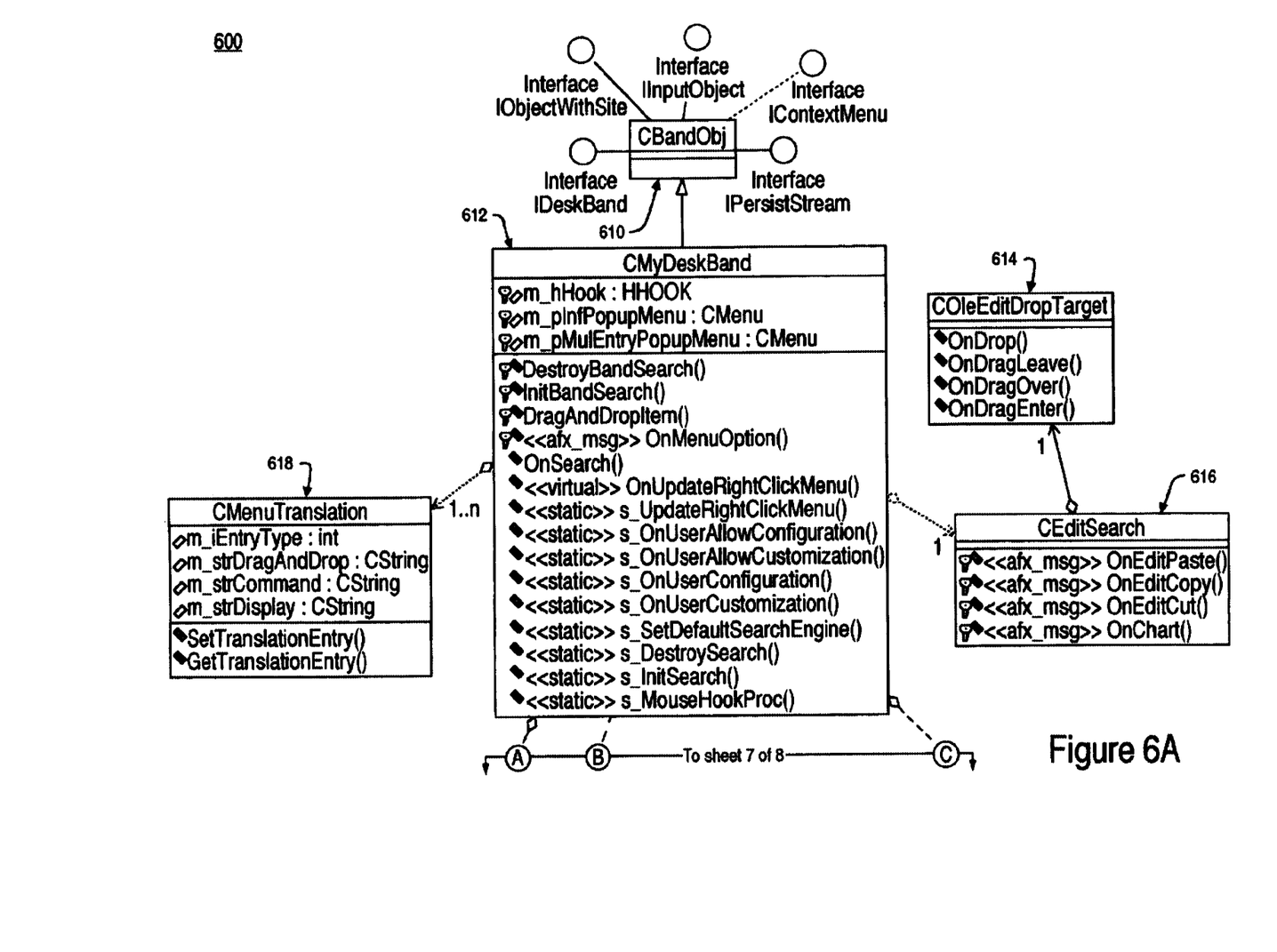
FIGS. 6A and 6B are Universal Modeling Language class diagrams showing implementations of software components and interfaces for accessing and retrieving information in accordance with one embodiment of the present invention.
Figure 6B:
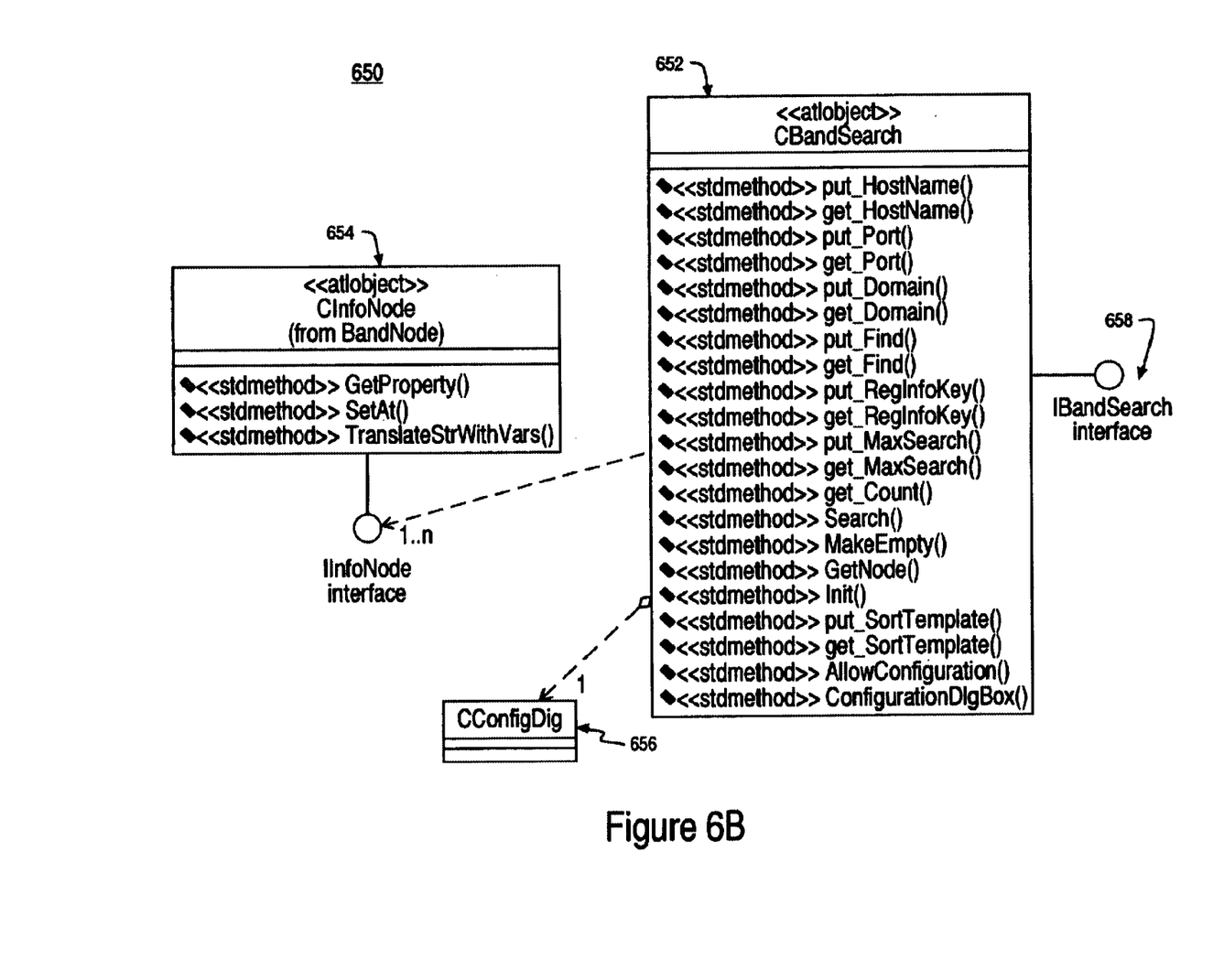

FIGS. 6A and 6B are Universal Modeling Language class diagrams 600 and 650, respectively, showing the implementation of software components and interfaces for accessing and retrieving information (e.g., from a database or Web site) in accordance with one embodiment of the present invention. Diagrams 600 and 650 can be implemented via computer-readable program instructions stored in a memory unit (e.g., random access memory 102, read-only memory 103, and/or data storage device 104) and executed by processor 101 of computer system 190 (FIG. 2) in a client-server computer system network (e.g., network 170 of FIG. 3).

With reference to FIG. 6A, diagram 600 shows one embodiment of the directory band architecture. In the present embodiment, CBandObj 610 is an abstract class to create band objects that implement the necessary interfaces. CMyDeskBand 612 starts a search and displays the results. CMyDeskBand 612 is responsible for handling pop-up menus with results, dragging menu items, and executing an action when, for example, the user presses "enter" or "return" to start a search. CMyDeskBand 612 also makes use of a search engine defined by the interface IBandSearch 658 (FIG. 6B).

Continuing with reference to FIG. 6A, COleEditDropTarget 614 implements the drop action of a drag-and-drop event in CEditSearch 616. CEditSearch 616 implements the graphical user interface (e.g., editbox 430 of FIG. 4) and the copy/paste functionality. CMenuTranslation 618 stores and retrieves the menu entries to be displayed, the commands to be executed, and the text to be dragged on, for example, a directory band. CSearchEngine 620 stores and retrieves search engines from a registry. CCustomizeDlg 622 is a dialog box for customizing menu entries, drag-and-drop and commands to execute. CEzAutoComplete 624 and CAutoComplete 626 implement an "auto complete" feature similar to other such features known in the art.

With reference next to FIG. 6B, diagram 650 shows one embodiment of the directory band's search engine architecture and the methods for creating a new search engine. CBandSearch 652 comprises the relevant methods to create a search engine. CinfoNode 654 is passed back to the client computer system (e.g., client computer system 190a of FIG. 3) for each GetNode (from CBandSearch 652). A search engine that implements ConfigurationDlgBox (from CBandSearch 652) implements a dialog box to interface with the user (CConfigDlg 656).

In summary, the present invention provides a method and system for improving access to databases and Web sites. The present invention also provides a method and system that can reduce the time needed for a user to retrieve information from a database or Web site. In addition, the present invention provides a method and system that can reduce the impact on network resources, primarily with regard to the memories and processors of the client and server computer systems.

The preferred embodiment of the present invention, directory band shell extension, is thus described. While the present invention has been described in particular embodiments, it should be appreciated that the present invention should not be construed as limited by such embodiments, but rather construed according to the following claims.

What is claimed is:

1. A computer system comprising:
    a software component that generates a graphical user interface having a field;
    wherein a query received in said field is searchable in a database comprising information residing at a site identified by a Uniform Resource Locator on a server computer system communicatively coupled to said computer system via a computer system network;
    wherein receiving said query in said field causes said database at said site to be accessed and searched without generating a Web page for said site and without launching a Web browser; and
    wherein information in response to said query is retrieved from said database and displayed in a pop-up menu.

2. The system of claim 1 wherein said database is accessed using a protocol substantially compliant with Lightweight Directory Access Protocol (LDAP).

3. The system of claim 1 wherein said information comprises multiple items and wherein selection of an item automatically initiates a corresponding application.

4. In a computer system network, a computer-implemented method for retrieving information from a database, said method comprising:
    a) generating a graphical user interface at a client computer system, said graphical user interface having a field;
    b) receiving a query in said field, wherein said query is searchable in a database comprising information at a site identified by a Uniform Resource Locator and residing on a server computer system in said computer system network; and
    c) responsive to said b), said client computer system accessing and searching said database without generating a Web page for said site and without launching a Web browser, wherein information in response to said query is retrieved from said database and displayed in a pop-up menu.

5. The method for retrieving information from a database as recited in claim 4 wherein said database is accessed using a protocol substantially compliant with Lightweight Directory Access Protocol (LDAP).

6. The method for retrieving information from a database as recited in claim 4 wherein said information comprises multiple items and wherein selection of an item automatically initiates a corresponding application.

7. A computer system in a computer system network, said computer system comprising:
    a bus;
    a processor coupled to said bus;
    a memory unit coupled to said bus
    said memory unit containing instructions that when executed implement a method for retrieving information from a database, said method comprising:
        a) generating a graphical user interface at said computer system;
        b) receiving a query in a field of said graphical user interface, wherein said query is searchable in a database residing at a site identified by a Uniform Resource Locator, said site residing on a server computer system communicatively coupled to said computer system via said computer system network; and
        c) responsive to said b), accessing and searching said database from said computer system without generating a Web page for said site and without launching said Web browser, wherein information in response to said query is retrieved from said database and displayed in a pop-up menu.

8. The computer system of claim 7 wherein said database is accessed using a protocol substantially compliant with Lightweight Directory Access Protocol (LDAP).

9. The computer system of claim 7 wherein said information comprises multiple items and wherein selection of an item automatically initiates a corresponding application.

10. A computer-usable medium having computer-readable program code embodied therein for causing a computer system to perform a method for retrieving information from a database, said method comprising:
    a) generating a graphical user interface at a client computer system in a computer system network, said graphical user interface having a field;
    b) receiving a query in said field, wherein said query is searchable in a database comprising information at a site identified by a Uniform Resource Locator and residing on a server computer system in said computer system network; and c) responsive to said b), said client computer system accessing and searching said database without generating a Web page for said site and without launching a Web browser, wherein information in response to said query is retrieved from said database and displayed in a pop-up menu.

11. The computer-usable medium of claim 10 wherein said database is accessed using a protocol substantially compliant with Lightweight Directory Access Protocol (LDAP).

12. The computer-usable medium of claim 10 wherein said information comprises multiple items and wherein selection of an item automatically initiates a corresponding application.

13. In a computer system network, a system for retrieving information from a database, said system comprising:

means for executing a method for retrieving said information from a site identified by a Uniform Resource Locator and residing on a server computer system in said computer system network;

means for generating a graphical user interface having a field and for receiving an entry in said field;

means for accessing said database in response to receiving said entry and for providing information retrieved from said database; and means for searching said database based on said entry, wherein said database is accessed and searched without generating a Web page for said site and without launching a Web browser, wherein information in response to said query is retrieved from said database and displayed in a pop-up menu.

14. The system for retrieving information from a database as recited in 13 further comprising:

means for displaying said information received from said database in said pop-up menu.

15. The system for retrieving information from a database as recited in claim 13 wherein said means for searching is substantially compliant with Lightweight Directory Access Protocol (LDAP).

* * * * *